Jan. 19, 1932.   J. C. ROSE   1,841,382
FILM STABILIZER FOR SOUND PICTURE PROJECTORS
Filed Nov. 19, 1929   2 Sheets-Sheet 1
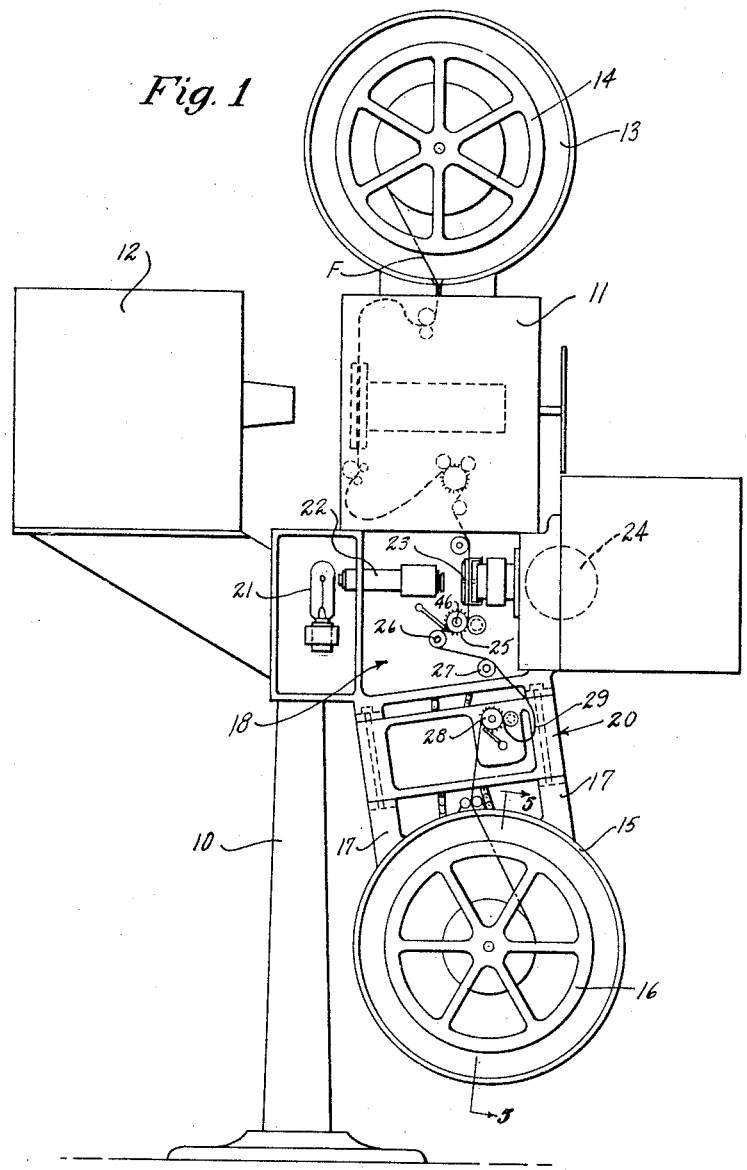
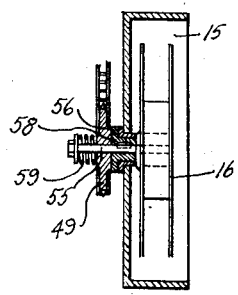
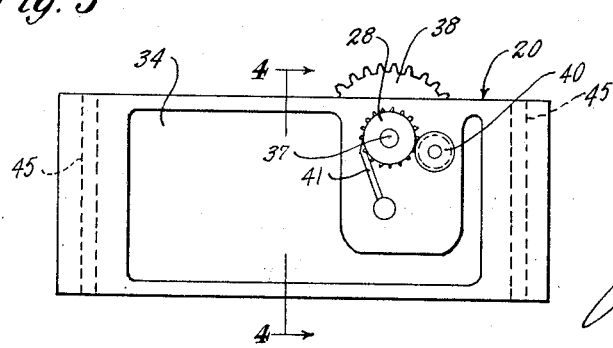
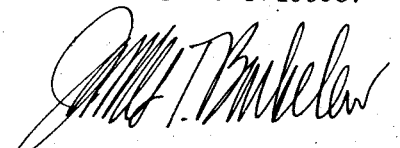
Inventor
Jess C. Rose.
Attorney.

Jan. 19, 1932.    J. C. ROSE    1,841,382
FILM STABILIZER FOR SOUND PICTURE PROJECTORS
Filed Nov. 19, 1929    2 Sheets-Sheet 2
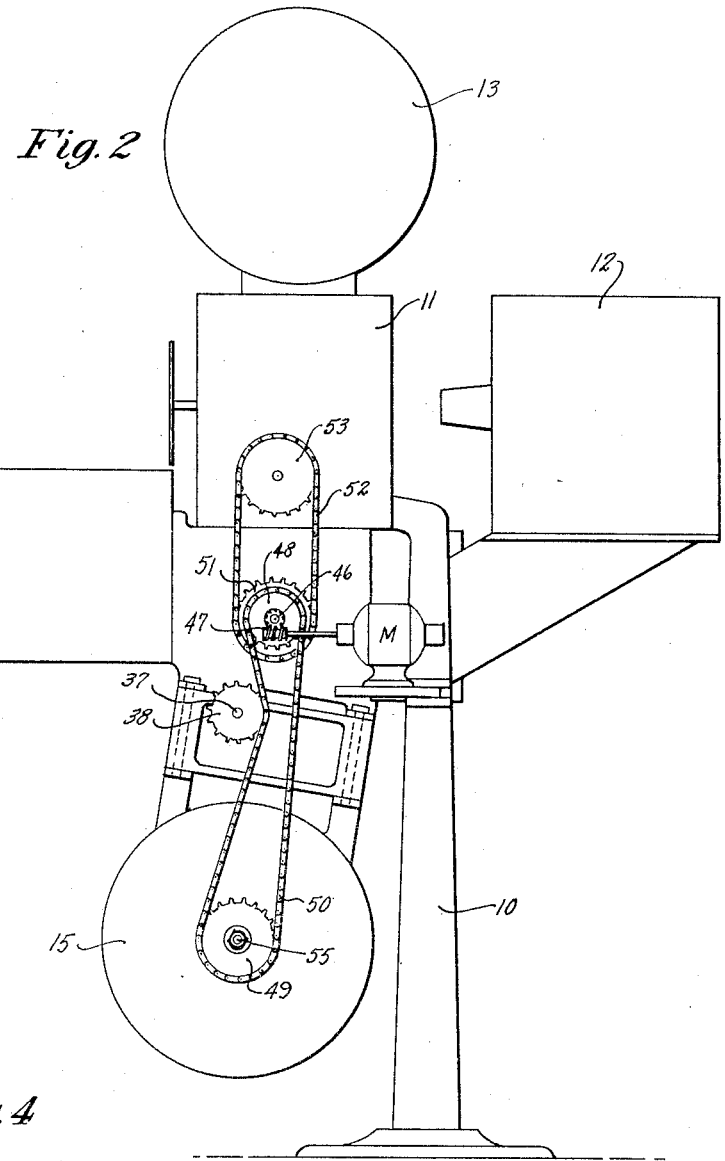
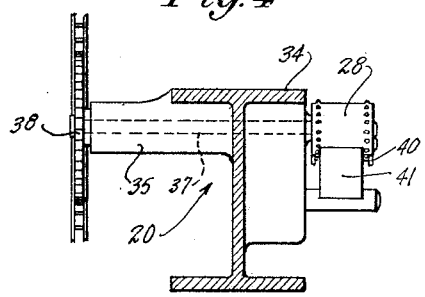
Inventor
Jess C. Rose.
Attorney.

Patented Jan. 19, 1932

1,841,382

UNITED STATES PATENT OFFICE

JESS C. ROSE, OF LOS ANGELES, CALIFORNIA

FILM STABILIZER FOR SOUND PICTURE PROJECTORS

Application filed November 19, 1929. Serial No. 408,245.

This invention relates generally to sound picture projectors of the general type utilizing photographic sound records, and is more particularly concerned with means for securing uniformity and stability of film motion through such projectors.

It has been common to adapt certain commercial motion picture projectors for the projection of sound pictures of the photographic sound record type by simply inserting a sound reproducing unit between the projector head and the lower or takeup film magazine. The film then passes, in a common arrangement, from the projector head past the "sound" aperture of the reproducing unit, then over a driving sprocket carried by the sound unit, and from there over one or more guide rollers to the take-up reel in the lower magazine. Such an arrangement, however, is incapable of satisfactory sound reproduction for the reason that the action of the take-up reel is inherently unsteady (due, for instance, to the film winding up loosely and unevenly on the take-up reel so that its weight distribution thereon is not uniform), this condition causing the film to jerk on the single sprocket provided between the "sound" aperture and the take-up reel, and, due to unavoidable back lash in the sprocket driving means, the film is thereby caused to be moved in an unsteady or jerky fashion past the "sound" aperture, with a consequent unsteadiness of reproduction.

It is therefore the primary object of my invention to provide the type of projectors to which I refer with means for stabilizing the motion of the film so that it will be moved past the sound aperture with perfect uniformity.

I accomplish this object by equipping the projector with a unit providing a second driving sprocket for the film, this unit being located between the sound projection unit and the take-up reel. The film then jerks against this second sprocket, while a loop provided in the film between the two sprockets prevents the jerk from being transmitted back to the first sprocket, and thus insures uniformity of film motion at the sound aperture.

The invention will best be understood from the following detailed description of a present preferred embodiment thereof, reference for this purpose being had to the accompanying drawings in which:

Fig. 1 shows, in more or less diagrammatic form, a motion picture projector converted for the projection of sound pictures and showing the application of my invention thereto;

Fig. 2 is a view looking at the rear of the projector shown in Fig. 1;

Fig. 3 is an enlarged side elevation of the stabilizing unit embodying my invention;

Fig. 4 is a vertical transverse section taken on line 4—4 of Fig. 3; and

Fig. 5 is a transverse section taken on line 5—5 of Fig. 1 and showing conventionally a friction drive for the take-up reel of the projector.

Referring now to the drawings, the numeral 10 indicates the supporting standard of a type of motion picture projector originally adapted for the projection of "silent" pictures only, and embodying a head 11 and lamphouse 12 mounted on standard 10, an upper magazine 13 in which is located a feed reel 14, and a lower magazine 15 in which is located a frictionally driven take-up reel 16.

The magazine 15 is carried by a frame member 17, which originally was secured to the lower side of the projector head 11. To adapt the projector for sound pictures, the magazine was dropped and the sound reproducing unit 18 inserted between it and the head 11. To apply my present invention, the magazine 14 is further dropped and my stabilizing unit 20 inserted between it and the sound reproducing unit 18, the projector then appearing as shown in the figures.

The film F passes from the feed reel 14 through the "picture projection" head 11, and from there through the sound reproducing or projection unit 18, in which is typically provided an exciting lamp 21, a lens tube 22, a "sound" aperture located at 23, and a photo-electric cell 24. The film entering the reproducing unit passes first over the sound aperture 23, then under the "sound" sprocket 25, and from there over guide rollers 26 and 27 to a sprocket 28 provided by the stabilizer unit 20, a loop 29, however, being provided in the film between sprockets 25 and 28; and from sprocket 28 the film passes into magazine 15 to be reeled up on the take-up reel 16.

The stabilizer unit 20 embodies a frame casting 34 which provides a bearing 35 for the stabilizer sprocket drive shaft 37. Mounted on the rear end of shaft 37 is a sprocket wheel 38 which is adapted to be driven by the same chain that drives the take-up reel, as hereinafter explained. Casting 34 also supports a retaining roller 40 and stripper plate 41, of usual form, for the sprocket 28, as illustrated. The casting is provided with drill holes 45 through which the stabilizer is adapted to be bolted between the sound reproducing unit and the frame part 17 of the lower magazine, as clearly indicated in Figs. 1 and 2.

The "sound" sprocket 25 is mounted on a shaft 46 which is conventionally shown as driven through gears 47 by means of a motor M (see Fig. 2). Shaft 46 is provided with sprocket wheel 48, and a chain 50 drivingly connects sprocket wheel 48 with a sprocket wheel 49 through which the take-up reel is frictionally driven.

The friction drive for the take-up reel is conventionally illustrated in Fig. 5, in which the sprocket wheel 49 is shown loosely mounted on a drive shaft 55 for the take-up reel, and formed with a friction surface 56 adapted to frictionally drive a disk 58 fixed on shaft 55, driving engagement of surface 56 with disk 58 being secured by virtue of an expansion spring 59 acting against the outer surface of the sprocket wheel, as indicated.

Shaft 46 is shown as provided with a second sprocket wheel 51 which is drivingly connected with the projector head through a chain 52 and sprocket 53.

The sprocket wheel 38, which drives stabilizer sprocket 28, is arranged to mesh with and be driven by chain 50, and is determined in size so that the sprocket 28 which is driven thereby advances the film at the proper linear speed.

In the operation of the machine, as was previously explained, the film frequently winds up on the take-up reel with its weight unequally distributed thereon, and this condition causes an unsteadiness of rotation, the reel accelerating each time its heavy side descends. This variation in velocity is permitted, of course, due to the fact that the take-up reel is driven with "slip". And each time the reel accelerates, as just described, a jerk is imparted to the film; but this jerk is exerted only against the stabilizer sprocket 28 and is not transmitted to the "sound" sprocket 26 which is thus permitted to rotate steadily to move the film uniformly past the "sound" aperture.

While the invention has herein been described particularly as embodied as a unit for insertion in a "silent" motion picture projector converted for "sound" pictures, it will be understood that the invention is not restricted thereto but may be incorporated in projectors originally designed for the projection of sound pictures.

It will be understood the drawings and description are to be considered merely as illustrative of and not restrictive on the broader claim appended hereto, for various changes in design, structure and arrangement may be made without departing from the spirit and scope of said claim.

I claim:

In a sound projector having a film feed reel, sound record reproducing means, a slip-driven take-up reel, and film driving means for feeding the film to the reproducing means: a film sprocket mounted on the projector beyond the reproducing means and arranged to pull the film past said means, another film sprocket mounted on the projector over which the film subsequently passes before reaching the take-up reel, the film being formed with a loop between said sprockets, and the last sprocket acting as a hold-back against irregularities in film tension due to the operation of the take-up reel, and means to drive said sprockets together with the first mentioned film driving means.

In witness that I claim the foregoing I have hereunto subscribed my name this 13 day of August, 1929.

JESS C. ROSE.